(12) United States Patent
Kohashi et al.

(10) Patent No.: US 6,791,625 B1
(45) Date of Patent: Sep. 14, 2004

(54) VIDEO PROCESSING APPARATUS FOR PERFORMING ADDRESS GENERATION AND CONTROL, AND METHOD THEREFOR

(75) Inventors: Yasuo Kohashi, Kasuya-gun (JP);
Toshihiro Moriiwa, Fukuoka (JP);
Shunichi Kuromaru, Fukuoka (JP);
Hiromasa Nakajima, Machida (JP);
Tomonori Yonezawa, Fukuoka (JP);
Miki Arita, Iizuka (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/868,183

(22) PCT Filed: Dec. 13, 1999

(86) PCT No.: PCT/JP99/06997

§ 371 (c)(1),
(2), (4) Date: Jul. 12, 2001

(87) PCT Pub. No.: WO00/36841

PCT Pub. Date: Jun. 22, 2000

(30) Foreign Application Priority Data

Dec. 15, 1998 (JP) .......................................... 10-356670

(51) Int. Cl.$^7$ ............................................... H04N 9/64
(52) U.S. Cl. ...................................... 348/718; 348/716
(58) Field of Search ................................ 348/714, 716,
348/718; 375/240.26; 345/531, 543, 547,
555, 564, 571, 572; 358/1.16; 710/22, 26,
74; 711/100, 170

(56) References Cited

U.S. PATENT DOCUMENTS

| 4,101,926 | A | * | 7/1978 | Dischert et al. ............. 348/514 |
| 4,835,612 | A | * | 5/1989 | Ohishi ........................ 348/716 |
| 5,541,658 | A | * | 7/1996 | Ishiwata .................... 348/394.1 |
| 5,631,713 | A | * | 5/1997 | Hoshino ...................... 348/716 |
| 5,675,387 | A | * | 10/1997 | Hoogenboom et al. 375/240.15 |
| 5,978,509 | A | | 11/1999 | Nachtergaele et al. ...... 382/236 |

FOREIGN PATENT DOCUMENTS

| EP | 0 838 956 A2 | 4/1998 |
| JP | 2-20988 | 1/1990 |
| JP | 4-218847 | 8/1992 |
| JP | 5-75989 | 3/1993 |
| JP | 5-236455 | 9/1993 |
| JP | 10-257493 | 9/1998 |
| JP | 10-313459 | 11/1998 |

OTHER PUBLICATIONS

F. Catthoor et al., "System–Level Data–Flow Transformation Exploration and Power–Area Trade–offs Demonstrated on Video Codees" Journal of VLSI Signal Processing, vol. 18, No. 1, 1998, pp 39–50.

L. Nachtergaele et al., "Low–Power Data Transfer and Storage Exploration for H.263 Video Decoder System," IEEE Journal on Selected Areas in Communications, vol. 16, No. 1, Jan. 1998, pp 120–129.

* cited by examiner

Primary Examiner—Victor R. Kostak
(74) Attorney, Agent, or Firm—Parkhurst & Wendel, L.L.P.

(57) ABSTRACT

Apparatus and method for data transmission while performing encoding processing on a non-limited moving vector mode, which avoids an increase in required memory capacity and a reduction in processing load, the apparatus comprising a two dimensional address generating unit for generating an access address of an external memory and an address control unit for administrating the horizontal position and the vertical position of the extended logical space and generating an operation authorizing signal for the two dimensional address generating unit, and the two dimensional address generating unit and the address control unit are operated in relation to each other so that an access address to outside the effective video data region is controlled to be an address of a pixel data at the periphery of the effective video data region, thereby reducing the extended region in the external memory.

5 Claims, 13 Drawing Sheets

Fig.3

| reference | kinds of setting information required by two dimensional address generating unit |
|---|---|
| SA | start address value of access rectangle |
| NX | value which is obtained horizontal access number of access rectangle-1 |
| DX | horizontal address displacement value of access rectangle |
| NY | value which is obtained vertical access number of access rectangle-1 |
| DY | vertical address displacement value of access rectangle |

Fig.4

| reference | kinds of setting information required by address control unit |
|---|---|
| HSA | horizontal start address value of extended logical space |
| HMAX | horizontal address limit value of extended logical space |
| DX | the same value as that of setting information of two dimensional address generating unit |
| VSA | vertical start address value of extended logical space |
| VMAX | vertical address limit value of extended logical space |
| DV | vertical address displacement value of extended logical space |

Fig.11 (a)

| EXTPAT | | | | HP | VP | AA' |
|---|---|---|---|---|---|---|
| 1 | 0 | 0 | 1/0 | -16 | <0 | 768 |
| 1 | 0 | 0 | 1/0 | -15 | <0 | 769 |
| 1 | 0 | 0 | 1/0 | -14 | <0 | 770 |
| 1 | 0 | 0 | 1/0 | -13 | <0 | 771 |
| 1 | 0 | 0 | 1/0 | -12 | <0 | 772 |
| 1 | 0 | 0 | 1/0 | -11 | <0 | 773 |
| 1 | 0 | 0 | 1/0 | -10 | <0 | 774 |
| 1 | 0 | 0 | 1/0 | -9 | <0 | 775 |
| 1 | 0 | 0 | 1/0 | -8 | <0 | 776 |
| 1 | 0 | 0 | 1/0 | -7 | <0 | 777 |
| 1 | 0 | 0 | 1/0 | -6 | <0 | 778 |
| 1 | 0 | 0 | 1/0 | -5 | <0 | 779 |
| 1 | 0 | 0 | 1/0 | -4 | <0 | 780 |
| 1 | 0 | 0 | 1/0 | -3 | <0 | 781 |
| 1 | 0 | 0 | 1/0 | -2 | <0 | 782 |
| 1 | 0 | 0 | 1/0 | -1 | <0 | 783 |

Fig.11 (b)

| EXTPAT | | | | HP | VP | AA' |
|---|---|---|---|---|---|---|
| 1/0 | 1/0 | 0 | 1 | >16 | 0 | 799 |
| 1/0 | 1/0 | 0 | 1 | >16 | 1 | 847 |
| 1/0 | 1/0 | 0 | 1 | >16 | 2 | 895 |
| 1/0 | 1/0 | 0 | 1 | >16 | 3 | 943 |
| 1/0 | 1/0 | 0 | 1 | >16 | 4 | 991 |
| 1/0 | 1/0 | 0 | 1 | >16 | 5 | 1039 |
| 1/0 | 1/0 | 0 | 1 | >16 | 6 | 1087 |
| 1/0 | 1/0 | 0 | 1 | >16 | 7 | 1135 |
| 1/0 | 1/0 | 0 | 1 | >16 | 8 | 1183 |
| 1/0 | 1/0 | 0 | 1 | >16 | 9 | 1231 |
| 1/0 | 1/0 | 0 | 1 | >16 | 10 | 1279 |
| 1/0 | 1/0 | 0 | 1 | >16 | 11 | 1327 |
| 1/0 | 1/0 | 0 | 1 | >16 | 12 | 1375 |
| 1/0 | 1/0 | 0 | 1 | >16 | 13 | 1423 |
| 1/0 | 1/0 | 0 | 1 | >16 | 14 | 1471 |
| 1/0 | 1/0 | 0 | 1 | >16 | 15 | 1519 |

VIDEO PROCESSING APPARATUS FOR PERFORMING ADDRESS GENERATION AND CONTROL, AND METHOD THEREFOR

TECHNICAL FIELD

The present invention belongs to a technical field of a video processing for performing an encoding/decoding processing for video data by a processor which can be controlled by a program and the like, and relates to a video processing method and a video processing apparatus which include an address generating apparatus for generating an address for accessing a memory at transmitting data between more than two memories and which can perform an address control so as to access a video data of an effective video data region at accessing video data existing at outside the region of the effective video data stored in the memory.

BACKGROUND ART

In recent years, there is a growing concern about a system such as a visual telephone or a television conference, which system utilizes the video communication. However, since the transmission rate of the communication line employed in this system is generally low, a video encoding/encoding technique is necessary for transmitting a tremendous amount of video data and, actually, various kinds of encoding/decoding systems have so far been proposed. Further, under these circumstance, it is desired a video processing apparatus which performs video encoding/decoding processing by a processor controllable by a program and which can cope with various encoding/decoding systems flexibly by changing the program performing the control. Hereinafter, a conventional video processing apparatus which performs encoding/decoding processing by a processor controllable by a program will be described with reference to FIG. 13.

FIG. 13 is a block diagram illustrating a construction of a conventional video processing apparatus. This video processing apparatus includes, as shown in FIG. 13, a video input/output unit 1300 which inputs/outputs an input video or a display video, an external memory 1302 which memorizes video data or coded data, a processor unit 1303 which is operated by a program control, a DMA bus 1301 which performs the data transmission, in other words, the direct memory access (Direct Memory Access, hereinafter, referred to as "DMA") between the video input/output unit 1300 or the processor unit 1303 and the external memory 1302, and a DMA control unit 1305 which controls the data transmission between the video input/output unit 1300 or the processor unit 1303 and the external memory 1302.

The processor unit 1303 comprises an encoding/decoding unit 1304 which encodes/decodes video data stored in the external memory 1302.

The DMA control unit 1302 comprises a DMA setting holding unit 1306 which stores the setting information required for generating an access address to the external memory 1302, a two dimensional address generating unit 1307 which generates an access address of the external memory 1302 in accordance with the setting information of the DMA setting holding unit 1306, and a DRAM control unit 1308 which controls reading or writing from/to the access address of the external memory 1302, which access address is generated from the two dimensional address generating unit 1307.

The video processing apparatus thus constructed, will be described in brief with reference to FIG. 13 and FIG. 14 particularly on the operation thereof.

At first, when an input video is input to the video input/output unit 1300, the input video is subjected to the resolution conversion into the video size as a target of encoding ,and thereafter, transmitted to the external memory 1302 through the DMA bus 1301 by the control of the DMA control unit 1305. As the encoding object video size after performing the resolution conversion, for example, QCIF, which is constituted by horizontal 176 pixels×vertical 144 pixels, or CIF, which is constituted by horizontal 352 pixels×vertical 288 pixels or the like are employed. The processor unit 1303 divides the encoding object video into rectangular regions of horizontal 16 pixels×vertical 16 pixels or horizontal 8 pixels×vertical 8 pixels, to take in the result into the encoding/decoding unit 1304, and thereafter, performs the encoding processing, and stores the coded data in the external memory 1302. When performing DMA for the encoding object video from the external memory 1302 to the encoding/decoding unit 1304 in the processor unit 1303, when the processor 1303 sets the setting information for generating a rectangular access address to the DMA setting holding unit 1306, the two dimensional address generating unit 1307 generates an address of the external memory 1302 in which data of the rectangular region are stored by employing the setting information. The two dimensional address generating unit 1307 for generating the rectangular access address can be realized by a construction disclosed in Japanese Published Patent Application No. Hei.4-218847. That is, the two dimensional address generating device 1307 is constituted to have an accumulation register for writing the address value that is employed actually as well as a first to N-th accumulation registers which are independent in each scan direction and, it is constructed such that, when the scan direction is switched, the address value is calculated by that the incremental data of the scan direction is added to the accumulation register corresponding to the scan direction. Thereby, since N pieces of accumulation registers hold the results of the address calculation that is previously performed for that scan direction until the scan direction becomes the same scan direction next time, there is no need to calculate an start address and set the result to the accumulation register every time when the scan direction is switched, and therefore, it is possible to access multi-dimensional data of a part of multi-dimensional region among the multi-dimensional address region, successively.

Further, as for the decoding processing, coded data, stored in the external memory 1302, which were transmitted from another video processing apparatus are direct memory accessed to the encoding/decoding unit 1304 in the processor unit 1303, to be decoded in units of the rectangular region, and the decoded video data are stored in the external memory 1302.

FIG. 14 is a diagram illustrating the video data stored in the external memory 1302. In FIG. 14, 1400 denotes pixel data DMA performed from the video input/output unit 1300 to the external memory 1302. The numbers in the circles represent pixel positions, in more detail, the upper numbers represent pixel positions in the horizontal direction and the lower numbers represent pixel positions in the vertical direction. 1401 denotes an effective video data region DMA performed from the video input/output unit 1300 to the external memory 1302 and, in this case, shows horizontal 176 pixels and vertical 144 pixels. 1402 denotes a first pixel data extended region which is obtained by copying a pixel data (0, 0) at the top-left corner of the effective video data region 1401, 1403 denotes a second pixel data extended region which is obtained by copying a pixel data (0, 175) at the top-right corner of the effective video data region 1401, 1404 denotes a third pixel data extended region which is obtained by copying a pixel data (143, 175) at the bottom-right corner of the effective video data region 1401, 1405 denotes a fourth pixel data extended region which is obtained by copying a pixel data (143, 0) at the bottom-left hand corner of the effective video data region 1401, 1406 denotes a fifth pixel data extended region which is obtained by copying a pixel data line at the top of the effective video data region 1401, 1407 denotes a sixth pixel data extended region which is obtained by copying a pixel data line at the right corner of the effective video data region 1401, 1408 denotes a seventh pixel data extended region which copies a pixel data line at the bottom of the effective video data region 1401, and 1409 denotes an eighth pixel data extended region which copies a pixel data line at the left corner of the effective video data region 1401.

On the other hand, as an international standard of the encoding system for a television conference system, there is ITU-T recommendation H.263 standard. This H.263 standard is provided with option modes in order to enhance the encoding efficiency, among which there is a non-limited moving vector mode. This mode is disclosed in "TTC standard JT-H263 low-bit-rate communication video coding method" published by Corporate Juridical Person: Telegraph and Telephone Technology Committee. Briefly explained, it provides a moving compensation function using a moving vector showing an object which has jumped out of the effective video data region, and it is recognized it can enhance the encoding efficiency for a video which has low resolution and a video which is imaged by a moving camera.

Next, a description is given of a process of producing the extended regions 1402~1409 existing outside the effective video data region 1401 in the conventional video processing apparatus. When performing DMA from the video input/output unit 1300 in FIG. 13 to the external memory 1302, the effective data region 1401 in FIG. 14 is stored in the external memory 1302. Then, the processor 1303 in FIG. 13 copies pixel data existing at the corner of the effective data region 1401 stored in the external memory 1302 to the extended regions 1402~1409. Thus, an encoding processing using the non-limited moving vector mode is carried out. In this way, the extended regions 1402~1409 existing at outside the effective video data region 1401 are produced.

However, in the conventional video processing apparatus thus constituted, since the extended regions 1402~1409 are previously produced by the processor unit 1303 inside the external memory 1302 before starting the encoding processing of the non-limited moving vector mode, a memory capacity for the extended regions 1402~1409 is required, thereby resulting in an increase in the capacity of the external memory 1302.

In addition, since the processor unit 1303 produces the extended regions 1402~1409, a processing load of the processor unit 1303 would increase, thereby increasing the time required for the encoding process.

The present invention is made in view of the above-described problems, and has for its object to provide a method and an apparatus for video processing which prevents an in crease in the required capacity of the external memory at the data transmission between the external memory and the processor unit and further, can reduce the processing load of the processor unit.

DISCLOSURE OF INVENTION

According to a first aspect of the present invention, there is provided a video processing method, which comprises a processor unit for performing an encoding/decoding processing to data stored in a memory setting the setting information to a setting information holding unit, an address generating unit generating a rectangular access address according to the setting information, a memory control unit controlling the writing of the reading to/from the memory in accordance with the rectangular access address to perform the data transmission, which further comprises controlling, apart from the address generating unit, access positions in the horizontal direction and in the vertical direction and, when an access position exists at outside an effective data region, controlling an address of the address generation unit so as have an address value indicating the effective data region, thereby to perform a processing of video data compensation.

According to the present invention, it is only necessary for the memory to hold the effective video data, and therefore, it is possible to prevent an increase in the memory capacity required and, further reduce the processing load of the processor unit.

According to a second aspect of the present invention, there is provided a video processing apparatus for encoding or decoding effective video data stored in a memory, which makes the memory store only the effective video data therein, and when an encoding/decoding unit encodes or decodes a pixel data existing outside the effective video data region, encodes or decodes data existing at the periphery of the effective data region stored in the memory, which periphery is closest to the pixel data, by the address control or the address conversion.

According to the present invention, it is only necessary for memory to hold the effective video data, and therefore, it is possible to prevent an increase in the memory capacity required. Further there is no need to carry out an extension of the effective data region to an extended region previously, thereby it is possible to reduce a load for the extension processing.

According to a third aspect of the present invention, there is provided a video processing apparatus which includes a video input/output unit which makes video data input/output, a memory which stores video data and coded data, a processor unit which comprises an encoding/decoding unit for outputting setting information required for generating a rectangular access address of a rectangular region to be accessed to the memory and performing an encoding/decoding processing to the data stored in the memory, an address generating unit which generates the rectangular access address and further, generates a horizontal conclusion signal when the address generation in the horizontal direction is concluded and a vertical conclusion signal when the address generation in the vertical direction is concluded, while generating the rectangular access address, a setting information holding unit which holds setting information issued from the processor unit, which setting information is required for generating the rectangular access address by the address generating unit, an address control unit which administrates a horizontal or vertical access position to the memory on the basis of the setting information, the horizontal conclusion signal, and the vertical conclusion signal, detects whether or not the access position is within a region stored in the memory, and outputs an operation authorizing signal to the address generating unit when it is within the region, while does not output the operation authorizing signal to the address generation unit when it is not within the region, thereby to control the address generation by the address generation unit, and a memory control unit which controls the writing or the reading to/from the memory according to the rectangular access address generated from the address generating unit.

According to the present invention, it is possible to control an access address to outside the effective video data region so as to be an address of a video data at the edge of the effective video data region, thereby it is possible to prevent an increase in the required capacity of the external memory at the data transmission between an external memory and a processor unit, and further, to reduce the processing load of the processor unit.

According to a fourth aspect of the present invention, there is provided a video processing apparatus which includes a video input/output unit which makes video data input/output, a memory which stores video data and coded data, a processor unit which comprises an encoding/decoding unit for outputting setting information required for generating a rectangular access address of an access rectangular region to be accessed to the memory and performing an encoding/decoding processing to the data stored in the memory, an address generating unit which generates the rectangular access address and further, generates a horizontal conclusion signal when the address generation in the horizontal direction is concluded and a vertical conclusion signal when the address generation in the vertical direction is concluded, when generating the rectangular access address, a setting holding unit which holds the horizontal start position information, the horizontal position displacement information, the horizontal position limit value information, the vertical start position information, the vertical position displacement information, and the vertical position limit value information as the setting information issued from the processing unit, which setting information are required for generating the rectangular access address by the address generating unit, an address control unit which comprises a horizontal position control unit for controlling an access position in the horizontal direction, according to the horizontal start position information and the horizontal position displacement information, and a vertical position control unit for controlling an access position in the vertical direction, according to the vertical start position information and the vertical position displacement information, and further comprises an operation authorizing signal generating unit which generates an operation authorizing signal for authorizing the operation of the address generating unit according to the horizontal positional information issued from the horizontal position control unit, the vertical position information issued from the vertical position control unit, the horizontal position limit value information and the vertical position limit value information issued from the setting information holding unit respectively, and the horizontal conclusion signal and the vertical conclusion signal issued from the address generating unit respectively, and a memory control unit which controls the writing or the reading to/from the memory according to the rectangular access address generated from the address generating unit.

According to the present invention, it is possible to control an access address to outside the effective video data region so as to be an address of a video data at the periphery of the effective video data region, thereby it is possible to prevent an increase in the required capacity of the external memory at the data transmission between an external memory and a processor unit, and further to reduce the processing load of the processor unit.

According to a fifth aspect of the present invention, there is provided a video processing apparatus which includes a video input/output unit which makes video data input/output, an external memory which stores video data and coded data, and an encoding/decoding unit which decides an access rectangular region to be read out from the external memory, and reads out data of the effective access rectangular region included in the effective video data region among the access rectangular region from the external memory, thereby to perform the encoding/decoding processing thereto, wherein the encoding/decoding unit comprises a data processing unit for performing the encoding/decoding processing to data, an internal memory for storing the data of the effective access rectangular region read out from the external memory, a control unit for producing a data processing rectangular region which is to be transmitted from the internal memory to the data processing unit in the access rectangular region and outputting a start address of the data processing rectangular region and an extension pattern indicating a relative position between the access rectangular region and the effective video data region, an address generating unit for generating an access address in the data processing rectangular region with the start address as a start position, and an address conversion unit which outputs the address to the internal memory as it is when an address generated from the address generating unit is within the effective access rectangular region, and converts the address generated from the address generating unit into an address within the effective access rectangular region, on the basis of the extension pattern when an address generated from the address generating unit is not within the effective access rectangular region, and outputs the result to the internal memory.

According to the present invention, since it is not necessary for the internal memory and the external memory to store data of the extended region, it is possible to prevent an increase in the memory capacity required. Further, since it is not necessary to perform an extension of an effective video data region to the extended region previously, it is possible to reduce the load for the extension processing.

According to a sixth aspect of the present invention, in a video processing apparatus of the fifth aspect, the address conversion unit holds a table for the address conversion and performs the address conversion by employing the table.

According to the present invention, since it is not necessary for the internal memory and the external memory store data of the extended region, it is possible to prevent an increase in the memory capacity required. Further, since there is no need to perform an extension of an effective video data region to the extended region previously, it is possible to reduce the load for the extension processing. Furthermore, when realizing the address conversion by hardware, it is possible to reduce the processing load due to software in the encoding/decoding unit. Further, since such as multiplying processing are not required in the address conversion employing a table, it is not necessary to provide such as multipliers in the hardware, thereby resulting in reduction in the hardware size.

BRIEF DESCRIPTION OF DRAWINGS

FIG. 3 is a table illustrating the setting information of a two dimensional address generating unit, which is stored in the DMA setting holding unit according to the first embodiment of the present invention.

FIG. 4 is a table illustrating the setting information of the address control unit, which is stored in the DMA setting holding unit according to the first embodiment of the present invention.

FIG. 11(a) is a diagram illustrating a part of address conversion table according to the second embodiment of the present invention.

FIG. 11(b) is a diagram illustrating a part of the address conversion table according to the second embodiment of the present invention.

BEST MODE TO EXECUTE THE INVENTION

Hereinafter, embodiments of the present invention will be described with reference to drawings. The embodiments as described here are only examples, and the present invention is not necessarily limited to these embodiments.

Embodiment 1

Figure 1:
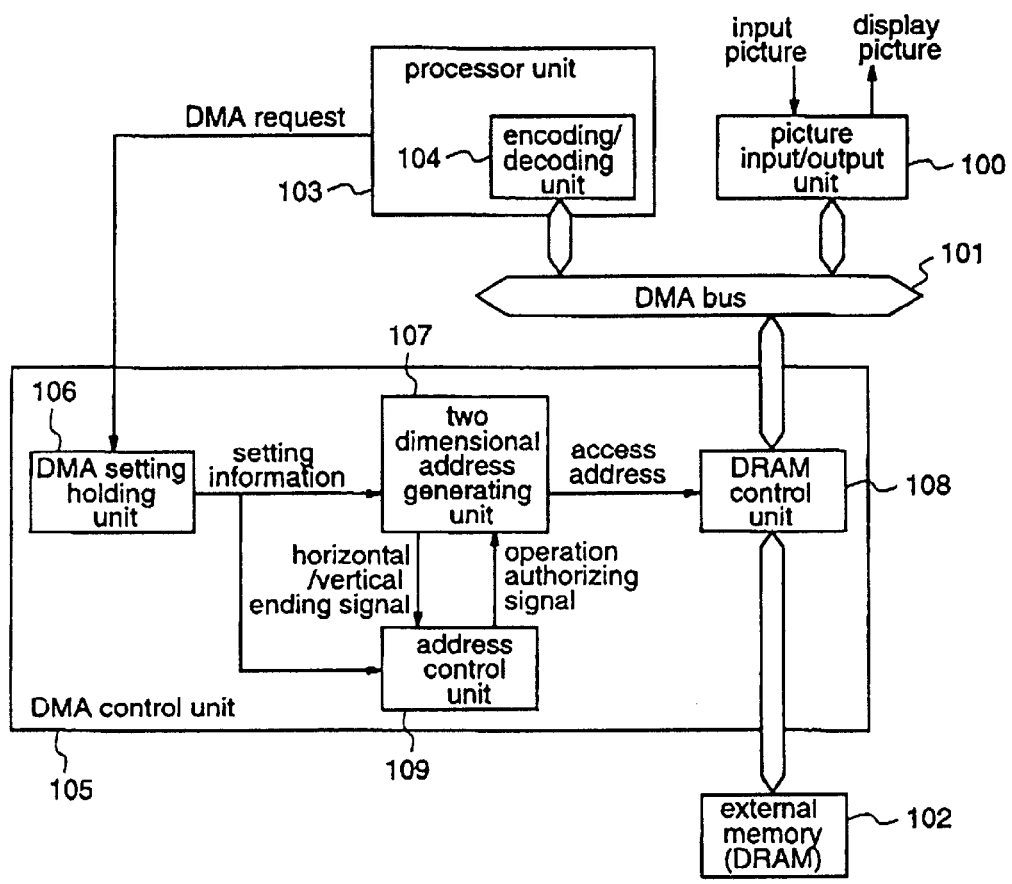
FIG. 1 is a block diagram illustrating a construction of a video processing apparatus according to a first embodiment of the present invention.

FIG. 1 is a diagram illustrating a construction of a video processing apparatus according to a first embodiment of the present invention.

Figure 13:
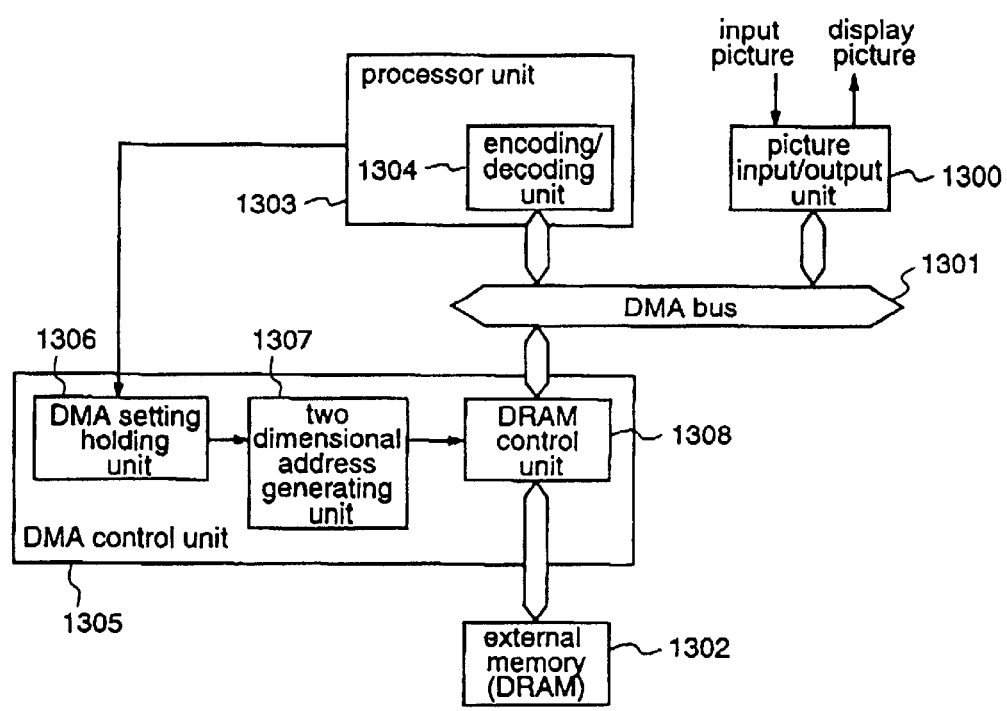
FIG. 13 is a block diagram illustrating a construction of a conventional video processing apparatus.
Figure 14:
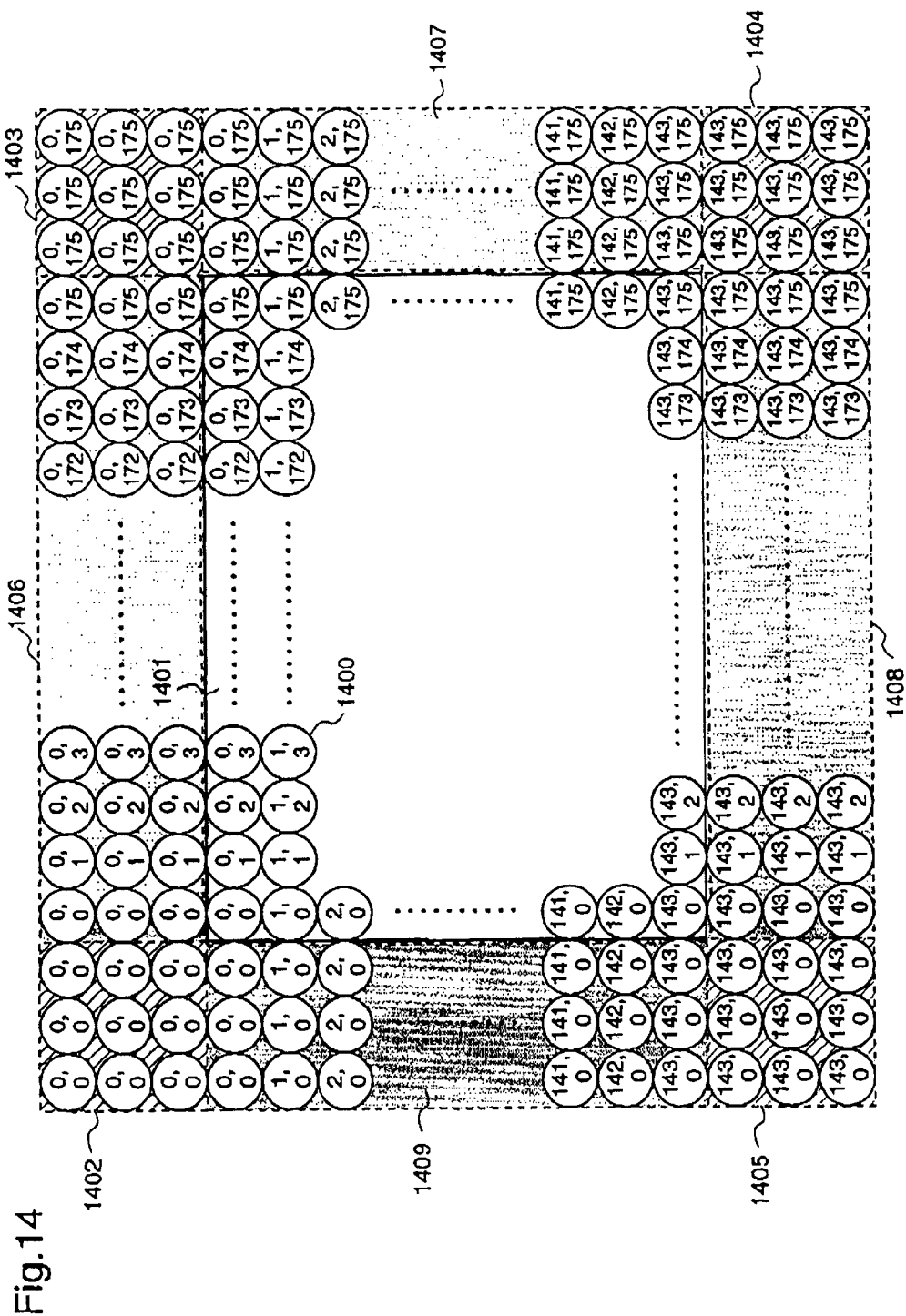
FIG. 14 is a schematic diagram illustrating a manner of storing a video in an external memory according to the conventional video processing apparatus.

The video processing apparatus according to the first embodiment is one that is obtained by providing an address control unit 109 with the conventional video processing apparatus shown in FIG. 13, which address control unit 109 administrates an access position of an extended logical space containing an extended region in accordance with the setting information in the DMA setting holding unit 106 and generates an operation authorizing signal for the two dimensional address generating unit 107. Further, in this video processing apparatus according to the first embodiment, a video input/output unit 100, a DMA bus 101, an external memory 102, a processor unit 103, an encoding/decoding unit 104, and a DR control unit 108 have respectively the same construction as the video input/output unit 1300, the DMA bus 1301, the external memory 1302, the processor unit 1303, the encoding/decoding unit 1304, and the DRAM control unit 1308 in the conventional video processing apparatus shown in FIG. 13.

Figure 2:
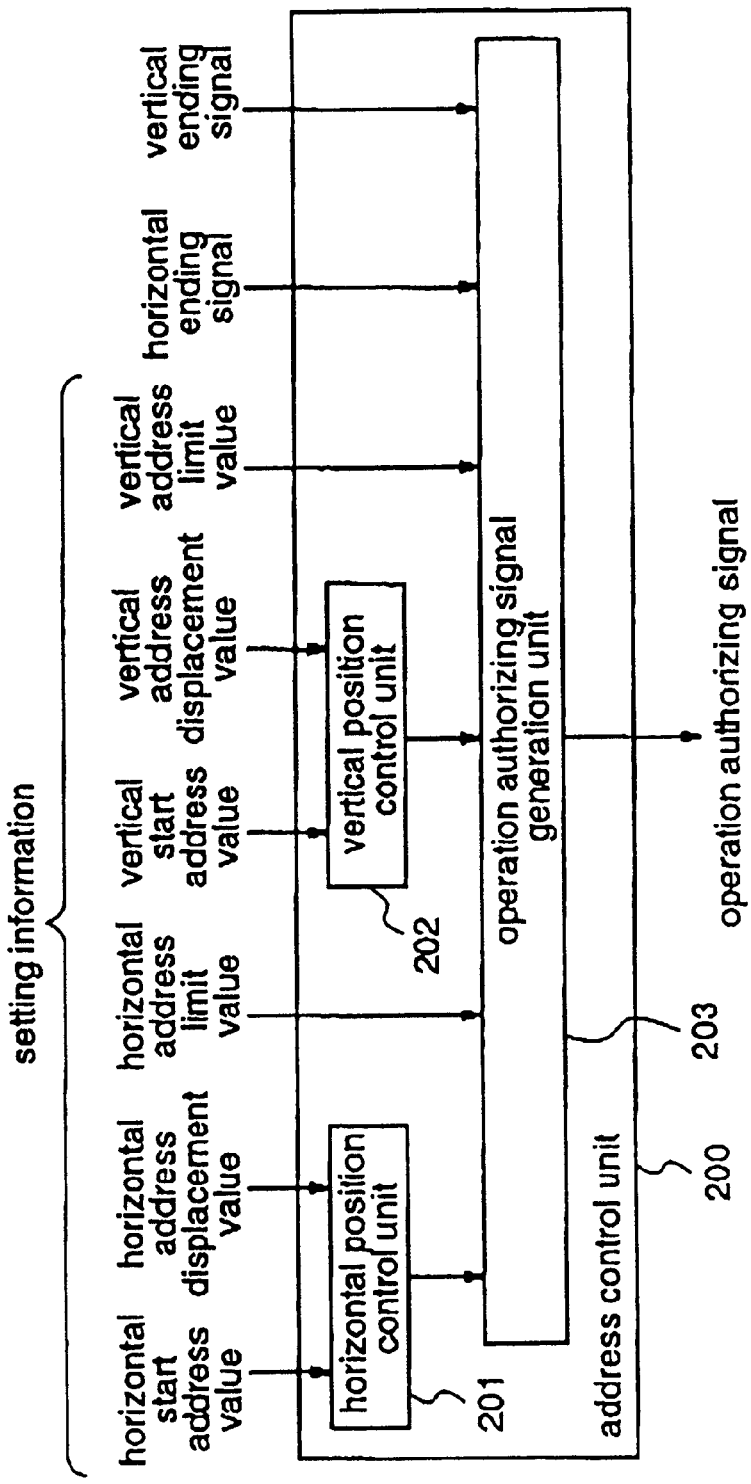
FIG. 2 is a block diagram illustrating a construction of an address control unit of the video processing apparatus according to the first embodiment of the present invention.

FIG. 2 is a diagram illustrating the construction of the address control unit 109. In FIG. 2, 200 denotes the address control unit 109 shown in FIG. 1.

The address control unit 109, as shown in FIG. 2, comprises a horizontal position control unit 201, a vertical position control unit 202 and an operation authorizing signal generating unit 203.

The horizontal position control unit 201 is one that controls the horizontal position in the extended logical space which is comprises region the effective video data region and an extended. The vertical position control unit 202 is one that controls the vertical position in the extended logical space. The operation authorizing signal generating unit 203 is one that generates an operation authorizing signal of the two dimensional address generating unit 107 from the horizontal position information from the horizontal position control unit 201, the vertical positional information from the vertical position control unit 202, a horizontal address limit value and a vertical address limit value both from the DMA setting holding unit 106 respectively, and a horizontal conclusion signal and a vertical conclusion signal both from the two dimensional address generating unit 107.

FIG. 3 is a table showing the setting information for the two dimensional address generating unit 107, stored in the DMA setting holding unit 106. In FIG. 3, SA presents the address value in case where the start address of the access rectangular region is set inside the effective video data region, NX presents the value obtained by subtracting 1 from the access number in the horizontal direction of the access rectangular region, DX presents the address displacement value in the horizontal direction of the access rectangular region, NY presents the value obtained by subtracting 1 from the access number in the vertical direction of the access rectangular region, and DY presents the address displacement value in the vertical direction of the access rectangular region.

FIG. 4 is a table showing the setting information of the address control unit 109, stored in the DMA setting holding unit 106. In FIG. 4, HSA presents a horizontal start address in the extended logical space of the access rectangular region, HMAX presents the address limit value in the horizontal direction of the extended logical space, and DX presents the address displacement value in the horizontal direction of the access rectangular region, which is the same as DX in FIG. 3. VSA presents an vertical start address in the extended logical space of the access rectangular region, VMAX presents the address limit value in the vertical direction of the address rectangular region, and DV presents the address displacement value in the vertical direction in the extended logical space of the access rectangular region.

Figure 5:
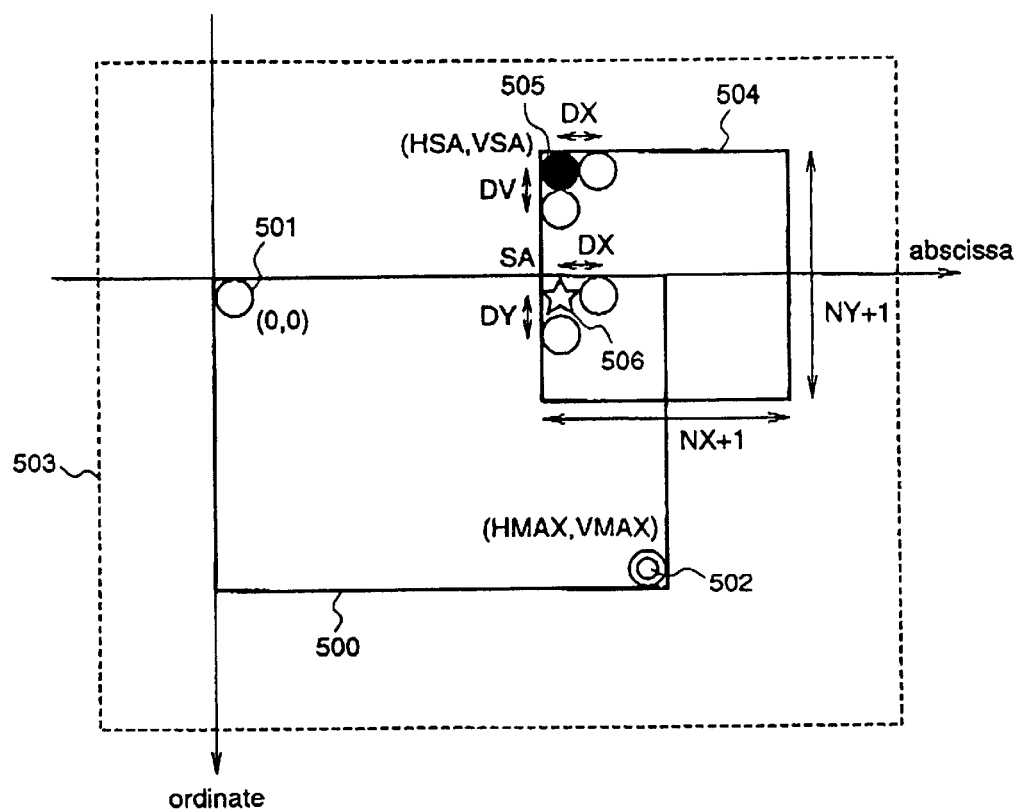
FIG. 5 is a schematic diagram illustrating an extended logical space according to the first embodiment of the present invention.

FIG. 5 is a diagram illustrating a case where the processor unit 3 performs a direct memory access from the extended region existing outside the effective video data region to the extended logical space administrated by the address control unit 109. In FIG. 5, 500 denotes an effective video data region stored in the external memory 102, 501 denotes a pixel data at top-left corner of the effective video data region 500, and is represented as (0, 0) in the coordinate of the extended logical space. 502 denotes a pixel data at bottom-right corner of the effective data region 500, and is represented as (HMAX, VMAX) in the coordinate of the extended logical space. 503 denotes an extended logical space containing a region which is produced by extending data at the periphery of the effective video data region 500, 504 denotes a rectangular region which is to be read from the external memory 102 by the processor unit 103, 505 denotes a start address of the rectangular region 504, as well as a two dimensional start address (HSA, VSA) set as setting information of the address control unit 109, and 506 denotes a start address SA set as setting information of the two dimensional address generating unit 107.

Hereinafter, the video processing apparatus thus constructed, particularly the operation thereof will be described.

Figure 6:
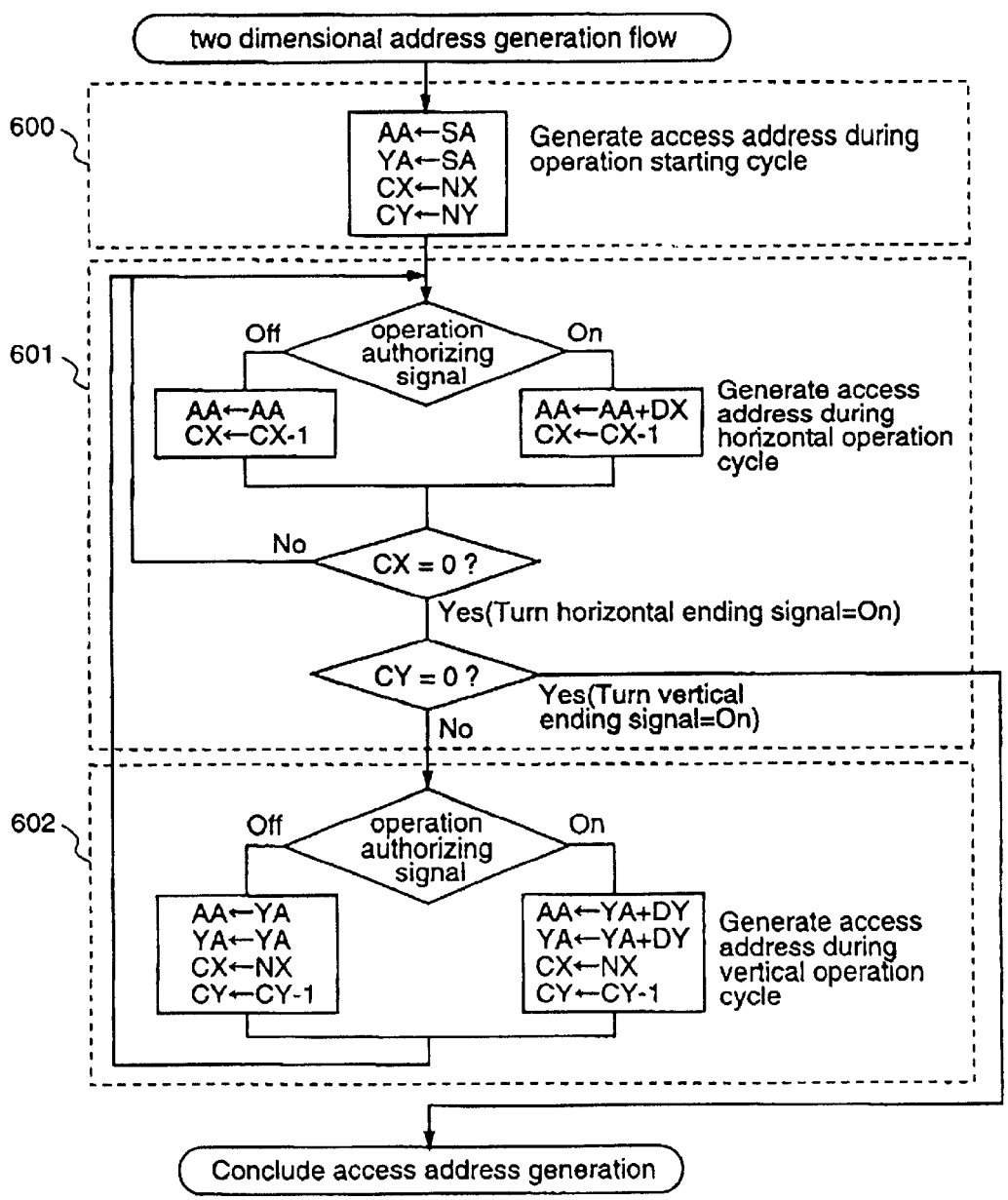
FIG. 6 is a flowchart illustrating an operation flow of the two dimensional address generating unit according to the first embodiment of the present invention.

FIG. 6 is a flowchart illustrating the operation flow of the two dimensional address generating unit 107. In FIG. 6, 600 denotes a step showing the operation of the first cycle when the two dimensional address generating unit 107 has started its operation, 601 denotes a step showing an operation cycle in which the addresses in the vertical direction are being generated by the two dimensional address generating unit 107, 602 denotes a step showing an operation cycle in which the address in the vertical direction is renewed by the conclusion of the generation of the address in the horizontal direction by the two dimensional address generating unit 107. Further, as references used in FIG. 6, as shown in a table in this figure, AA presents an access address for the external memory 102, generated in the two dimensional address generating unit 107, YA presents an initial address value in the vertical direction of the access rectangular region 504, i. e., an address value of the pixel data line at the left end of the access rectangular region 504, CX presents the count value indicating the access number in the horizontal direction of the access rectangular region 504, and CY presents the count value indicating the access number in the vertical direction of the access rectangular region 504.

At first, the processor 103 sets, to the DMA setting holding unit 106, SA, NX, DX, NY and DY to the in order to generate addresses of the access rectangular region 504 for accessing to the external memory 102, and further sets HAS, HMAX, VSA, VMAX and DV in order to generate an addresses of the extended logical space.

Then, in step 600, the two dimensional address generating unit 107 starts the initial operation, and it outputs SA as an access address AA to the external memory 102 and further, initializes the vertical initial address YA of the access rectangular region 504 by SA, the horizontal access count value CX of the access rectangular region 504 by NX, and the vertical access count value CY of the access rectangular region 504 by NY, respectively.

Subsequently, in step 601, the two dimensional address generating unit 107 decides where or not it renews the address, in accordance with On/Off of the operation authorizing signal output from the address control unit 109, and outputs the address to the DRAM control unit 108. If the operation authorizing signal from the address control unit 109 is On, the access address AA is changed at the next cycle to the previous value of AA+DX, and 1 is subtracted from CX, and thereafter, the access address AA is output to the DRAM control unit 108. When the operation authorizing signal output from the access address control unit 109 is Off, an access address AA is not renewed and only CX is subtracted by 1, and, the access address AA is output to the DRAM control unit 108. Then, whether the value CX is 0 or not is detected, and when the value CX is not 0, the horizontal access address AA is kept being generated in accordance with On/Off of the operation authorizing signal. On the other hand, when the value CX becomes 0, which means that the generation of the access address in the horizontal direction is concluded, the horizontal conclusion signal is turned On. Then, if the value of CY representing access number in the vertical direction is also 0, the vertical conclusion signal is turned On, and the two dimensional address generating unit 107 outputs the horizontal conclusion signal and the vertical conclusion signal to the address control unit 109 thereby to conclude the generation of the two dimensional address. However, when the value of CY representing the access number in horizontal direction is not 0, it proceeds to the next step 602.

In step 602, if the operating authorizing signal of the address control unit is On, access addresses AA and YA are both changed into AA+YA, CX is changed into NX, CY is subtracted by 1, and thereafter, the access address AA is output to the DRAM control unit 108. if the operation authorizing signal of the address control unit is Off, access addresses AA and YA are both changed into YA, CX is changed into NX, CY is subtracted by 1, and thereafter, the access address AA is output to the DRAM control unit 108. Then, it returns again to the horizontal address generating cycle in step 601. Finally, when the value CY instep 601 becomes 0, the vertical conclusion signal is turned On, the two dimensional address generating unit 107 outputs the horizontal conclusion signal and the vertical conclusion signal to the address control unit 109 thereby to conclude the generation of the two dimensional address.

Figure 7:
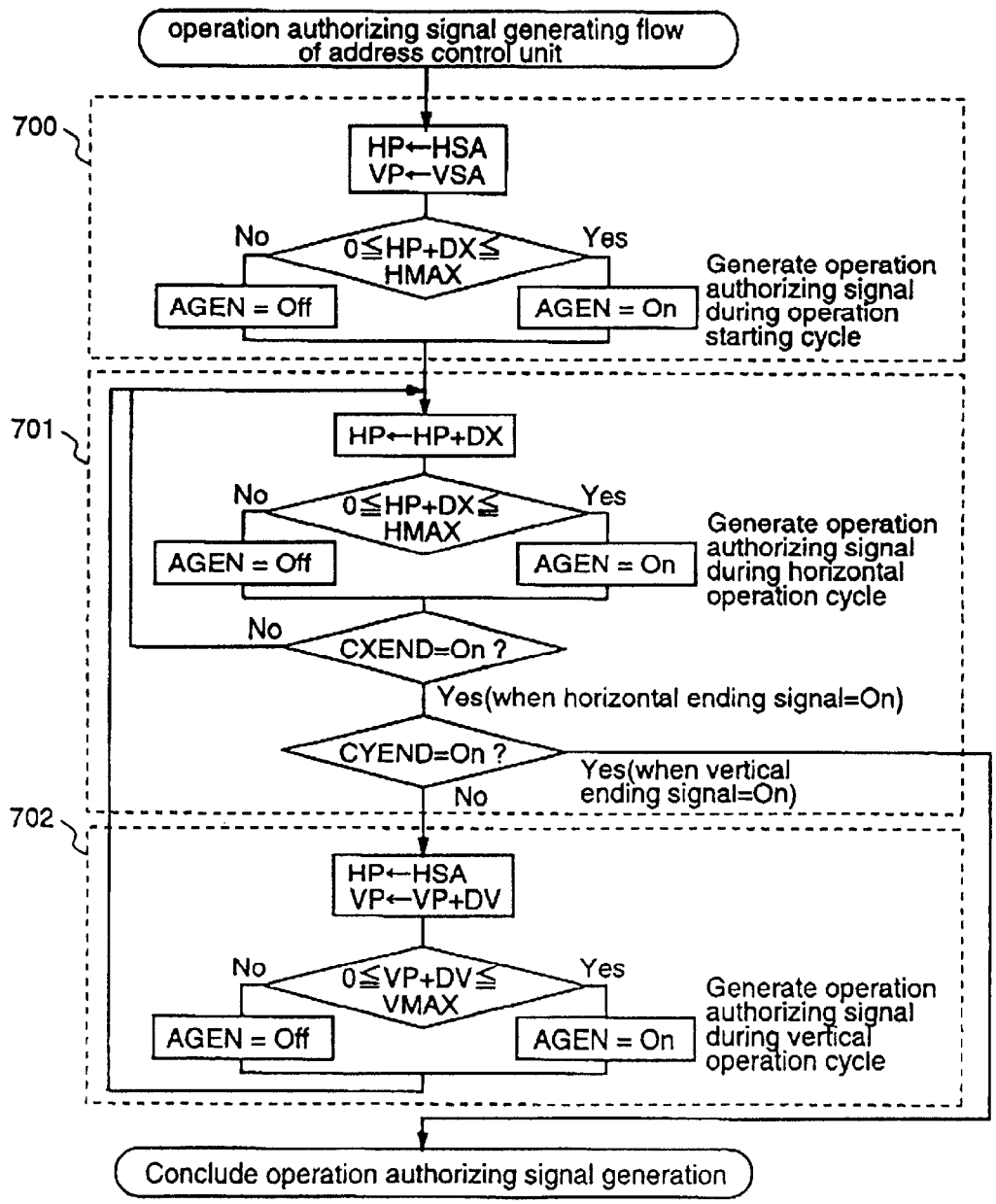
FIG. 7 is a flowchart illustrating an operation flow of the address control unit according to the first embodiment of the present invention.

FIG. 7 is a flowchart illustrating the operation flow of the address control unit 109. In FIG. 7, 700 denotes a step showing the operation of a first cycle when the address control unit 109 has started its operation, 701 denotes a step showing an operation cycle in which addresses in the horizontal direction of the extended logical space have been generated by the address control unit 109, and 702 denotes a step showing an operation cycle in which the address in the vertical direction of the extended logical space is renewed by the conclusion of the address generation in the horizontal direction by the two dimensional address generating unit 107. Further, as references used in FIG. 7, as shown in a table in this figure, AGEN presents an operation authorizing signal for turning the operation of the two dimensional address generating unit 107 On/Off, HP presents a horizontal address generated by the horizontal position administrating unit 201 at a horizontal position in the extended logical space, VP presents a vertical address generated by the vertical position administrating unit 202 at a vertical position in the extended logical space, CXEND presents a horizontal conclusion signal issued from the two dimensional address generating unit 107, and CYEND presents a vertical conclusion signal issued from the two dimensional address generating unit 107.

The address control unit 109 starts its operation, in connection with the two dimensional address generating unit 107, according to the set value of the DMA setting holding unit 106. At first, in step 700, a horizontal address HP of the horizontal position administrating unit 201 is initialized to be RSA and a vertical address VP of the vertical position administrating unit 202 is initialized to be VSA. Then, if the value HP+DX, as the next horizontal position, is larger than or equal to 0 and, further, smaller than or equal to the value HMAX, the operation authorizing signal AGEN is turned On. If the value HP+DX is otherwise, the operation authorizing signal AGEN is turned Off.

Next, in step 701, the horizontal address HP is renewed to the value HP+DX, and if the value HP+DX, as the next horizontal position, is larger than or equal to 0 and, further, smaller than or equal to the value HMAX, the operation authorizing signal AGEN is turned On, and if it is not, the operation authorizing signal AGEN is turned Off. Then, if the CXEND issued from the two dimensional address generating unit 107 is not On, the horizontal address HP is renewed on the following. If the horizontal conclusion signal CXEND is On, whether the vertical conclusion signal CYEND is On or not is detected, and when it is On, the operation of the address control unit 109 is concluded. When the vertical conclusion signal CYEND is not On, it proceeds to the next step 702.

In step 702, a horizontal address HP is renewed to HSA and a vertical address VP is renewed to the value VP+DV. Then, if the value VP+DV, as the next vertical position, is larger than or equal to 0 and, further smaller than or equal to the value VMAX, the operation authorizing signal AGEN is turned on, and if it is not, the operation authorizing signal AGEN is turned Off. Then it returns again to the horizontal address generating cycle in step 701. Finally, when the vertical conclusion signal CYEND issued from the two dimensional address generating unit 107 becomes On, the operation of the address control unit 109 is concluded.

As described above, according to the first embodiment of the present invention, the two dimensional address generating unit 107 for generating the access address to the external memory 102 and the address control unit 109 for administrating the extended logical space are operated in connection with each other, thereby a control is performed so that an access address to outside the effective video data region (505) should become an address of a pixel data at the periphery of the effective video data region (506). That is, in the video processing apparatus according to the first embodiment of the present invention, only the effective video data 500 is held in the external memory 102, and if an access address indicates outside the effective video data region before transmitting video data from the external memory 102 to the processor unit 103, the access address is controlled to be an address indicating the effective video data region thereby to perform data compensation, thereby, an increase in the required capacity of the external memory 102 can be prevented, and further the processing load of the processor 103 can be reduced.

Further, as the processor unit 103 of the first embodiment, a unit for setting the setting information required for generating the rectangular access address or the encoding/decoding unit 104 can be produced either by software by a program control or by hardware, respectively.

While the external memory 102 according to this first embodiment is constructed by a DRAM, it may be constructed by an SRAM.

In addition, the encoding/decoding unit 104 according to this first embodiment can be constructed to perform both of the encoding processing and the decoding process, or to perform only one of these processing.

Embodiment 2

Figure 8:
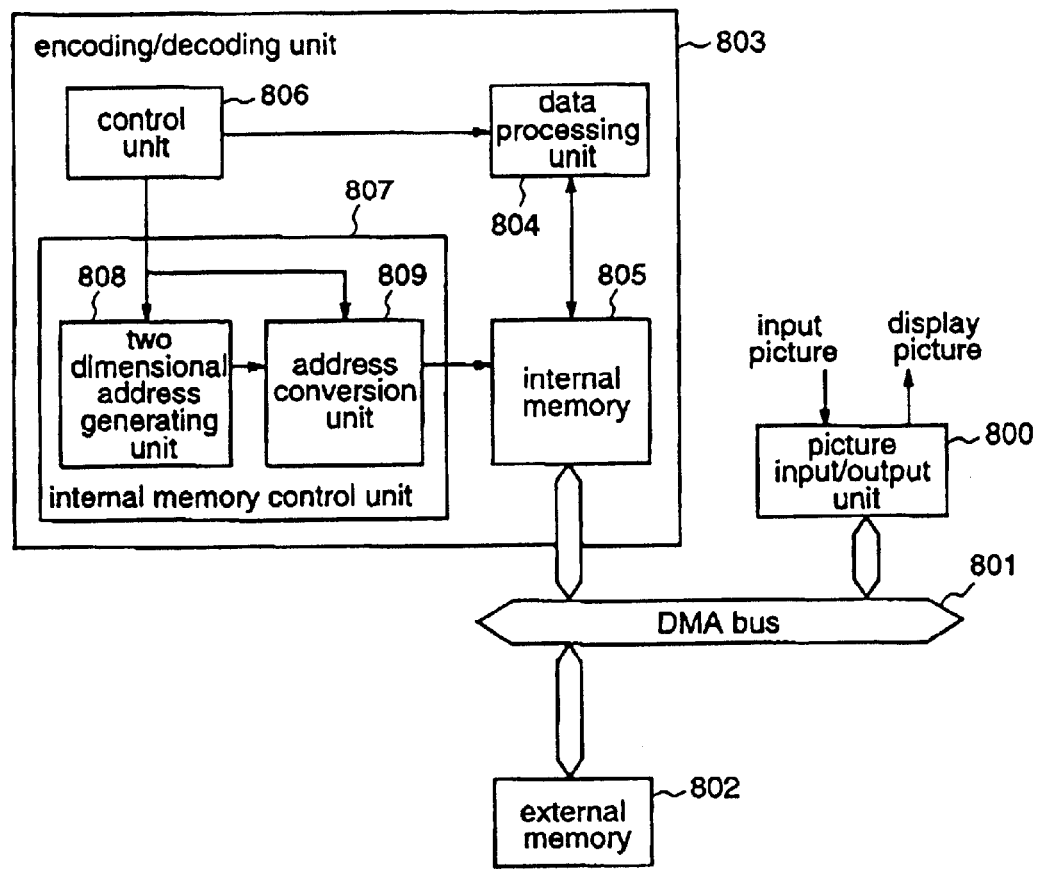
FIG. 8 is a block diagram illustrating a construction of a video processing apparatus according to a second embodiment of the present invention.

FIG. 8 is a diagram illustrating a construction of a video processing apparatus according to a second embodiment of the present invention.

The video processing apparatus according to the second embodiment of the present invention includes a video input/output unit 800 which inputs/outputs an input video or a display video, an external memory 802 which stores video data or coded data, an encoding/decoding unit 803 which performs an encoding/decoding processing to the video data or the coded data, and a DMA bus which performs the data transmission between the video input/output unit 800 or the encoding/decoding unit 803 and the external memory 802.

The encoding/decoding unit 803 comprises a data processing unit 804, an internal memory 805, a control unit 806, and an internal memory control unit 807.

The data processing unit 804 encodes or decodes video data. The internal memory 805 stores the video data read out from the external memory 802. The control unit 806 outputs a content of a processing and the processing timing to the data processing unit 804 and, further outputs a start address of the data region which is transmitted from the internal memory 805 to the data processing unit 804 to the internal memory control unit 807. The internal memory control unit 807 controls the data transmission from the internal memory 805 to the data processing unit 604.

The internal memory control unit 807 comprises a two dimensional address generating unit 808 for generating addresses according to the setting information from the control unit 806 and an address conversion unit 809 for converting an address input from the two dimensional address generating unit 808 into an access address to the internal memory 805.

Figure 9:
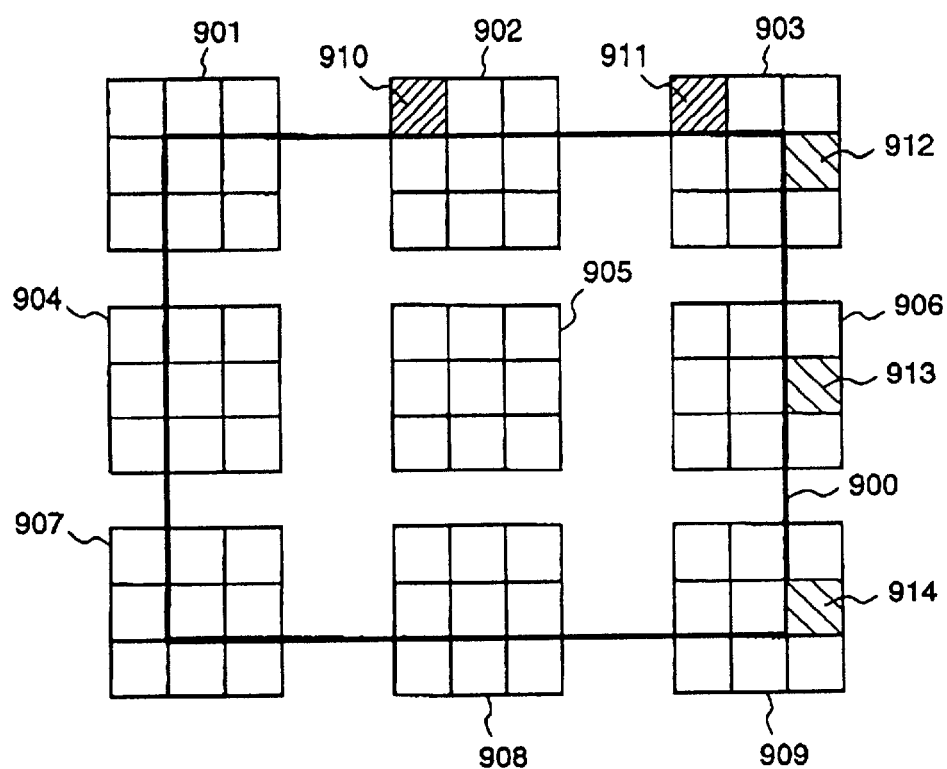
FIG. 9 is a diagram illustrating an effective video region and a rectangular region according to the second embodiment of the present invention.

FIG. 9 is a diagram illustrating an effective video data region 900 and the rectangular regions 901~909 read out from the external memory 802 by the encoding/decoding unit 803. As the effective video data region 900, for example, QCIF, which is constituted by horizontal 176 pixels×vertical 144 pixels, or CIF, which is constituted by horizontal 352 pixels×vertical 288 pixels is employed. The respective rectangular regions 901~909 are constituted by 48 horizontal×48 vertical pixels, which is produced by nine macro blocks (horizontal 16 pixels×vertical 16 pixels), and a block at the center of the nine macro blocks is established to overlap with any square of, for example, vertical 9×horizontal 11 macro blocks which can be taken on the QCIF video. Though there is a rectangular region a part of which jumps out from the effective video data region, this is for the purpose of performing an encoding processing of non-limited vector mode in the encoding/decoding unit 803.

While as patterns having a rectangular region against the effective video region, there are 99 patters in case where the effective video data region is QCIF video from the above description, when the ways of picking up 99 rectangular region are discriminated in view of the extension patterns from the effective video data region to the extended region, there are 9 kinds of patterns as shown in the rectangular regions 901~909 in FIG. 9. Here, it is evident that there are 9 extension patterns do not depend on whether the effective video data region is constituted by the QCIF video or not.

These 9 extension patterns will be referred as EXTPAT, and this EXPAT will be represented by 4 bits. That is, when a rectangular region has overlapping with any edges of the effective video data region, among the upper, lower, left and right edges, a figure corresponding to that edge of EXTPAT is made 1, and when it does not, a figure corresponding to that edge of EXTPAT is made 0. The numbers of four figures, each constituted by 0 or 1, which are arranged in the order of upper, lower, left, and right edges of the effective video data region 900, produces the EXTPAT. For example, the rectangular region 901 shown in FIG. 9, produces EXTPAT=1010.

Figure 10:
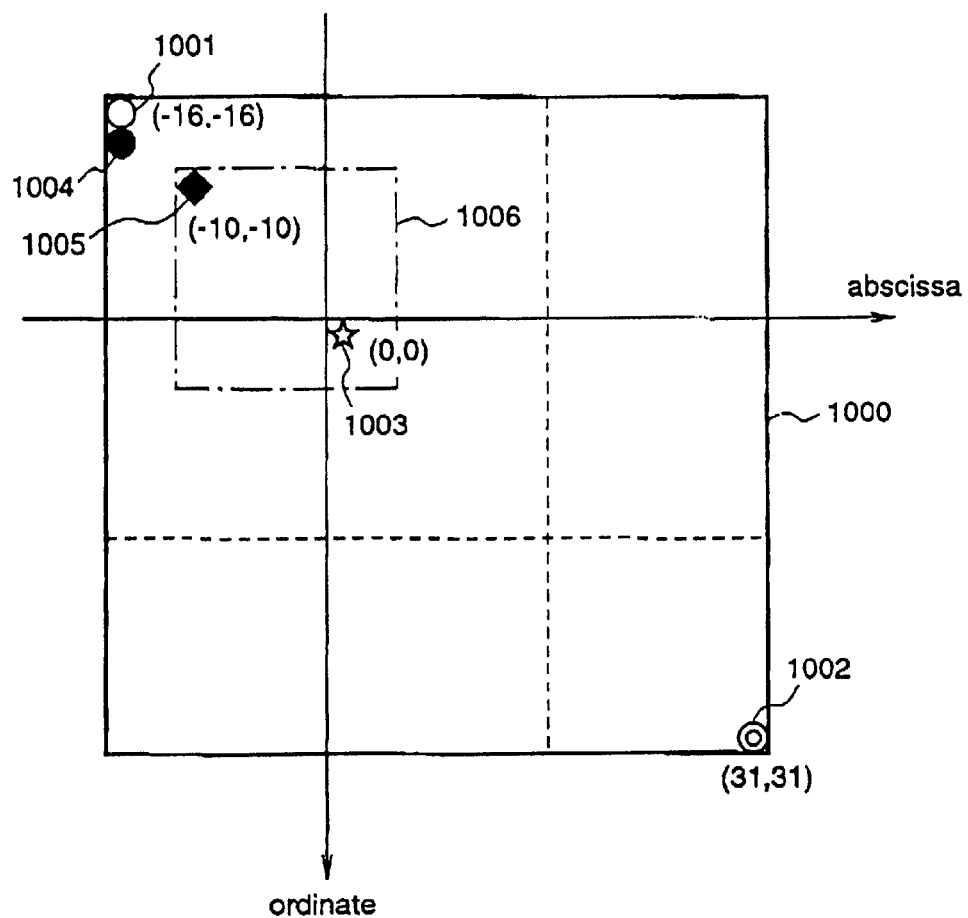
FIG. 10 is a diagram for explaining the relationship between a logical address and a physical address of the rectangular region according to the second embodiment of the present invention.

FIG. 10 is a diagram for explaining the correspondence between a (two dimensional) logical address and a (one dimension) physical address of the rectangular region (horizontal 48 pixels×vertical 48 pixels) in the internal memory 805. In the rectangular region 1000 shown in FIG. 10, each square region sectioned by a horizontal and vertical ordinates and broken lines is a macro block (horizontal 16 pixels×vertical 16 pixels). The logical address is constituted by a horizontal logical address HP and a vertical logical address VP. The address of a pixel data 1003 is (HP,VP)=

(0,0). The horizontal logical address HP is increased by 1 as is shifted to right by 1 pixel, and the vertical logical address VP is increased by 1 as is shifted to down by 1 pixel. So, the horizontal logical address HP and the vertical logical address VP respectively take a value from −16 to 31 in the rectangular region 1000.

On the other hand, as for the physical address AA, the position of a pixel 1001 at top-left corner of the rectangular region 1000 is 0, and it is increased by 1 as is shifted to right by 1 pixel.

When it reaches the right corner of the rectangular region 1000, it moves to the left corner of the rectangular region 1000, which is lower than the top line by 1 pixel, i.e., to a position of the pixel data 1004. So, the physical address AA of the pixel data 1004 is 48, and the physical address of the pixel data 1002 is 2303.

Hereinafter, a description is given of the operation of the video processing apparatus, thus constructed, according to the second embodiment.

At first, when an input video is inputted to the video input/output unit 800, input data is subjected to a resolution conversion by the video input/output unit 800 to be changed into a video size serving as a target of encoding, and thereafter, is transmitted to the external memory 802 though the DMA bus 801. As the encoding object video size which is obtained by performing the resolution conversion, QCIF, constituted by horizontal 176 pixels ×vertical 144 pixels or CIF, constituted by horizontal 352 pixels×vertical 288 pixels is employed. In order to perform encoding processing of non-limited vector mode, the encoding/decoding unit 803 performs the encoding/decoding processing by employing not only the effective video data region but also the extended region.

Therefore, the encoding/decoding unit 803 initially decides an access rectangular region, which is a rectangular region to be read, in the extended logical region which is produced by adding the extended region to the effective video data region.

The encoding/decoding unit 803 reads out a plurality of macro blocks contained in the effective video data region stored in the external memory 802, among the access rectangular regions which are to be read, i.e., video data in the effective access rectangular region, from the external memory 802 to the internal memory 805. In the internal memory 805, when the access rectangular region is constituted by horizontal 48 pixels×vertical 48 pixels, the physical address from 0 to 2303 is employed as an internal-memory address. The encoding/decoding unit 803 stores the video data of the effective access rectangular region, which were read out from the external memory 802, into corresponding addresses of the internal memory 805.

When transmitting an encoding object video or a decoding object video from the internal memory 805 to the data processing unit 804, the control unit 806 initially decides a data processing rectangular region in the access rectangular region to be transmitted to the data processing unit 804 and sets setting information for making the internal memory control unit 807 generate an access address for the data processing rectangular region. The setting information are a physical address AA as a start address, a horizontal logical address HP, a vertical logical address VP, and the EXTPAT.

Among the setting information input to the internal memory control unit 807, the physical address AA as the start address, the horizontal and the vertical logical address HP and VP are input to the two dimensional address generating unit, and the EXTPAT as the extension pattern is input to the address conversion unit 809. The two dimensional address generating unit 808 generates addresses of the data processing rectangular region successively on the basis of the input start address, and outputs the physical address AA and the horizontal and the vertical logical addresses HP and VP to the conversion unit 809.

For example, when the size of a data processing region is equal to a macro block which is constituted by horizontal 16 pixels×vertical 16 pixels, and further when an address of a pixel data 1005 in FIG. 10 is inputted as a start address from the control unit 806 to the two dimensional address generating unit 808, the data processing rectangular region to with the encoding/decoding processing is to be performed by the data processing unit 804 becomes the macro block 1006. The two dimensional address generating unit 808, generates starting from an address of a pixel data 1005, addresses with shifting to right by 1 pixel, and when it reaches the right edge of the macro block 1006, it shifts to down 1 by 1 pixel and returns to the left side of the macro block 1006, and further, generates addresses with shifting to right 1 by 1 pixel, thereby generating all addresses of the macro block 1006 successively. Further, to the address conversion unit 809, addresses generated by the two dimensional address generating unit 808 are input successively. The address conversion unit 809 outputs a physical address AA' which is obtained after being converted, on the basis of the physical address AA, the horizontal and the vertical logical address HP and VP, which are both input from the two dimensional address generating unit 808 and the EXTPAT which is input from the control unit 806.

At the conversion of addresses, the address conversing unit 809 converts these addresses by employing tables. Since there are 9 patterns of the EXTPAT, it is possible to carry out the address conversion by holding 9 address conversion tables for the rectangular region of horizontal 48 pixels×vertical 48 pixels.

However, when 9 address conversion tables for the rectangular region of horizontal 48 pixels×vertical 48 pixels are held, the capacity of the table data should become large as described above. Therefore, in order to reduce the capacity of the table data, an address conversion table for performing address conversion by performing respective 1 bit judgements of the 4 bits EXTPAT and judgements of the horizontal and the vertical logical address HP and VP is employed.

FIGS. 11(*a*) and 11(*b*) are diagrams illustrating parts of the address conversion table, respectively.

For example, in FIG. 9, since a macro block 910 and a macro block 911 have common points in their extension patterns to the extended regions and, further, in that they have the same relative positions against the rectangular regions such that the both macro blocks are respectively the top-left macro blocks of the rectangular regions 902 and 903, it is possible to carry out conversion of addresses by employing the table in FIG. 11(*a*). In addition, as for the macro blocks 912, 913 and 914 shown in FIG. 9, it is possible to carry out conversion of addresses by employing a table in FIG. 11(*b*), thereby the same effects as that obtained by adding the rectangular region to the effective video data region can be obtained. By employing the same tables for other regions, it is also possible to carry out the address conversion. In converting the addresses in the effective video region, the address conversion unit 809 is only required to output the physical address AA which is input thereto as the physical address AA' which is obtained after being converted.

To specific, supposed that the rectangular region 1000 shown in FIG. 10 is taken out from the rectangular region 902 shown in FIG. 9, when addresses of the pixel data 1005 are (HP, VP)=(−10, −10), and AA=294, it becomes EXTPAT=1000, and as a result, AA'=774, according to the table shown in FIG. 11(*a*). So, the address conversion unit 809 outputs this physical address AA'=774 afte the conversion to the internal memory 805.

The internal memory 805 outputs a pixel data corresponding to the address to the data processing unit 804 on the basis of the physical address AA' input from the internal memory control unit 807. Thus, the address generation by the two dimensional address generating unit 808, the address conversion by the address converting unit 809, and the transmission of pixel data from the internal memory 805 to the data processing unit 804 are carried out respectively and successively.

As described above, in the video processing according to the second embodiment of the present invention, since there are provided the two dimensional address generating unit 808 for generating an access address for the internal memory 805 and the address converting unit 809 for converting the address generated from the two dimensional address generating unit, it is possible to control an access address to outside the effective video data region so as to be an address of a pixel data existing at the periphery of the effective video region. That is, by holding only the effective video data in the external memory 802 and the internal memory 805, and, at transmission of video data from the internal memory 805 to the data processing unit 804, performing address conversion by the address converting unit 809 so that the access address becomes an address within effective video data region address when an address generated from the two dimensional address generating unit 808 indicates outside the effective video data region, it is possible to prevent an increase in the required capacity of the external memory 802 or the internal memory 805. Further, there is no need to previously extend the effective video data region to the extended region, thereby it is possible to reduce the load required for the extension processing.

In addition, when realizing the address conversion by hardware, it is possible to reduce the processing load due to software in the encoding/decoding unit 803. Further, since it is not necessary to perform such as a multiplying processing at the address conversion employing a table and thereby such as multipliers are not required for the hardware, it is possible to result in reduction in the hardware size.

Further, while in this second embodiment, the rectangular region read out by the encoding/decoding unit 803 is constituted by horizontal 48 pixels×vertical 48 pixels, this is only an example, and it is possible to carry out addition of the extended region employing the EXTPAT and the tables for rectangular regions other than the above-described rectangular region.

Further, while in this second embodiment a macro block constituted by horizontal 16 pixels×vertical 16 pixels is employed as a rectangular region which is transmitted from the internal memory 805 in the encoding/decoding unit 803, it is only an example, and it is also possible to transmit video data of a rectangular region other than macro blocks of horizontal 16 pixels×vertical 16 pixels from the internal memory 805 to the data processing unit 804.

The encoding/decoding unit 803 according to the second embodiment can be constituted either by software by a program control or by hardware.

Further, the external memory 802 and the internal memory 805 according to this second embodiment can be constituted either by DEAM or by SRAM respectively.

The encoding/decoding unit can be constituted to perform both of the encoding process and the decoding processing, or to perform only one processing of those processing.

Further, while in the second embodiment, at performing data transmission in the encoding/decoding unit 803, an addition of the pixel data extended region is carried out by employing the EXTPAT and the tables, it is also possible to carry out an addition of the pixel data extended region by employing the EXTPAT and the tables, which are the same as those employed in the second embodiment, at performing data transmission from the external memory to the processor unit, similarly as in the first embodiment.

Figure 12:
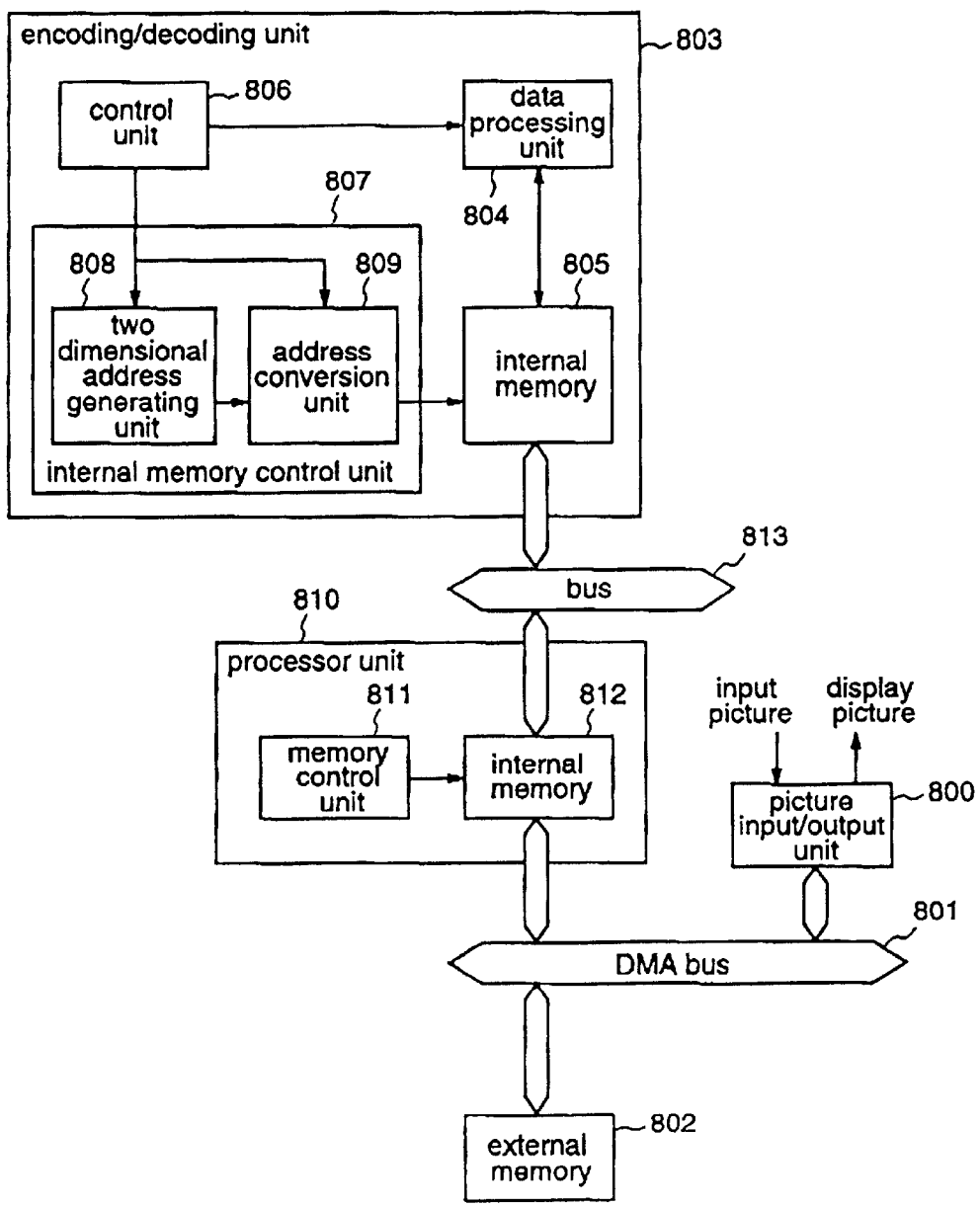
FIG. 12 is a block diagram illustrating a construction of the video processing apparatus according to the second embodiment of the present invention.

While in the second embodiment, the data transmission from the external memory 802 to the internal memory 805 in the encoding/decoding unit 803 is performed only through the DMA bus 801, it is only an example and, as shown in FIG. 12, it is also possible to provide a processor unit 810 for controlling the data transmission between the external memory 802 and the internal memory 805 or performing schedule administration. When the processor unit 810 is provided with the video processing apparatus, it is possible to realize the high quality video processing. In FIG. 12, 811 denotes a memory control unit for generating addresses or controlling the transfer timing to the internal memory 812. 813 denotes a bus for transmitting data at the data transmission between the internal memories 805 and 812. Further it is possible to provide a bus oriented for only data transmission at a position between the internal memories 805 and 812.

Applicability in Industory

As described above, the video processing method and the video processing apparatus are suitable for a video processing apparatus which encodes or decodes video data by a non-limited moving vector mode.

What is claimed is:

1. A video processing method comprising:
    storing setting information to a setting information holding unit by a processor unit configured for performing encoding/decoding processing of data stored in a memory which stores only effective video data;
    generating by an address generating unit a rectangular access address according to the setting information;
    controlling by a memory control unit one of writing and reading to/from the memory in accordance with the rectangular access address to perform data transmission; and
    controlling, apart from the address generating unit, access positions in a horizontal direction and in a vertical direction, and, when an access position exists outside the effective video data region in the memory, controlling, by the address control or address conversion, an address of the address generation unit to have an address value indicating a pixel position existing at the periphery of the effective video data region in the memory, said pixel Position being closest to pixel data closest to the effective video data region.

2. A video processing apparatus comprising:
    an encoding/decoding unit configured for encoding or decoding effective video data stored in a memory for storing only effective video data therein, and when the encoding/decoding unit encodes or decodes a pixel data existing outside the effective video data region, the encoding/decoding unit is for encoding/decoding data existing at the periphery of the effective video data region stored in the memory, said data being in a position closest to the pixel data, said position being indicated by an address value determined by the address control or the address conversion.

3. A video processing apparatus comprising:

a video input/output unit for inputting/outputting video data;

a memory for storing video data and coded data;

a processor unit comprising an encoding/decoding unit for outputting setting information required for generating a rectangular access address of a rectangular region to be accessed to the memory and performing encoding/decoding processing of the data stored in the memory;

an address generating unit for generating the rectangular access address and a horizontal conclusion signal when the address generation in the horizontal direction is concluded and a vertical conclusion signal when the address generation in the vertical direction is concluded, while generating the rectangular access address;

a setting information holding unit for holding setting information issued from the processor unit, said setting information for generating the rectangular access address by the address generating unit;

an address control unit for administering a horizontal or vertical access position to the memory on the basis of the setting information, the horizontal conclusion signal, and the vertical conclusion signal, detecting whether or not the access position is within a region stored in the memory, and outputting an operation authorizing signal to the address generation unit when the access position is within the region, while the address control unit does not output the operation authorizing signal to the address generation unit when the access position is not within the region, thereby controlling the address generation by the address generation unit; and a memory control unit for controlling the writing or the reading to/from the memory according to the rectangular access address generated from the address generating unit.

4. A video processing apparatus comprising:

a video input/output unit for inputting/outputting video data;

a memory for storing video data and coded data;

a processor unit comprising an encoding/decoding unit for outputting setting information required for generating a rectangular access address of an access rectangular region to be accessed to the memory and performing an encoding/decoding processing of the data stored in the memory;

an address generating unit for generating the rectangular access address and a horizontal conclusion signal when the address generation in the horizontal direction is concluded and a vertical conclusion signal when the address generation in the vertical direction is concluded, when generating the rectangular access address;

a setting holding unit for holding horizontal start position information, horizontal position displacement information, horizontal position limit value information, vertical start position information, vertical position displacement information, and a vertical position limit value as the setting information issued from the processing unit, said setting information for generating the rectangular access address by the address generating unit;

an address control unit comprising a horizontal position control unit for controlling an access position in the horizontal direction, according to the horizontal start position information and the horizontal position displacement information, and a vertical position control unit for controlling an access position in the vertical direction, according to the vertical start position information and the vertical position displacement information, and further comprises an operation authorizing signal generating unit which generates an operation authorizing signal for authorizing the operation of the address generating unit according to the horizontal positional information issued from the horizontal position control unit, the vertical position information issued from the vertical position control unit, the horizontal position limit value information and the vertical position limit value information issued from the setting information holding unit, respectively, and the horizontal conclusion signal and the vertical conclusion signal issued from the address generating unit, respectively; and a memory control unit for controlling writing or reading to/from the memory according to the rectangular access address generated from the address generating unit.

5. A video processing apparatus comprising:

a video input/output unit for inputting/outputting video data;

an external memory for storing video data and coded data; and an encoding/decoding unit for determining an access rectangular region to be read out from the external memory, and for reading out data of an effective access rectangular region included in an effective video data region among the access rectangular region from the external memory, to perform the encoding/decoding processing thereof, wherein the encoding/decoding unit comprises:

a data processing unit for performing the encoding/decoding processing of data, an internal memory for storing the data of the effective access rectangular region read out from the external memory, a control unit for producing a data processing rectangular region which is to be transmitted from the internal memory to the data processing unit in the access rectangular region and outputting a start address of the data processing rectangular region and an extension pattern indicating a relative position between the access rectangular region and the effective video data region, an address generating unit for generating an access address in the data processing rectangular region with the start address as a start position, and an address conversion unit for outputting the address to the internal memory as it is when an address generated from the address generating unit is within the effective access rectangular region, and for converting the address generated from the address generating unit into an address within the effective access rectangular region, on the basis of the extension pattern when an address generated from the address generating unit is not within the effective access rectangular region, and for outputting the result to the internal memory.

* * * * *